Sept. 16, 1969   G. W. CHENEY   3,466,701
APPARATUS FOR BLOW MOLDING BOTTLES
Original Filed Oct. 19, 1965   4 Sheets-Sheet 4
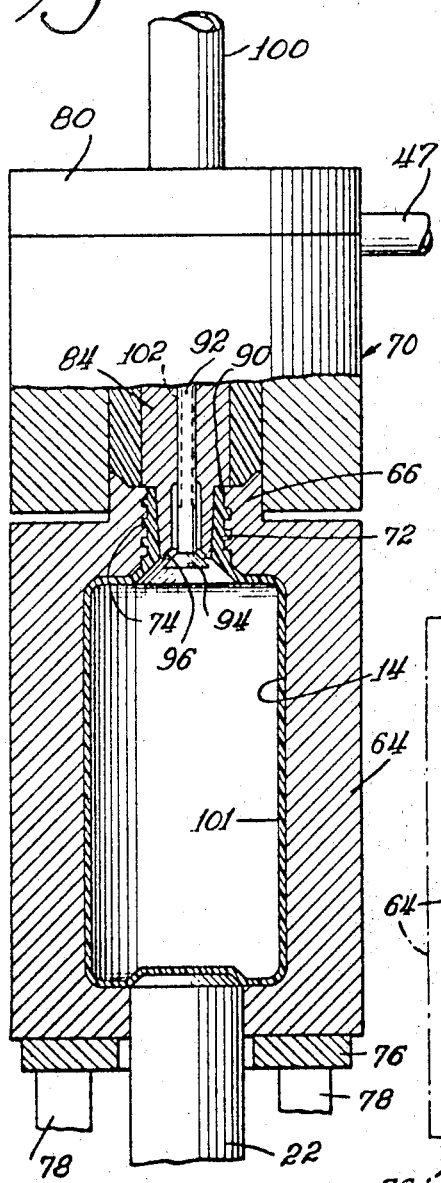
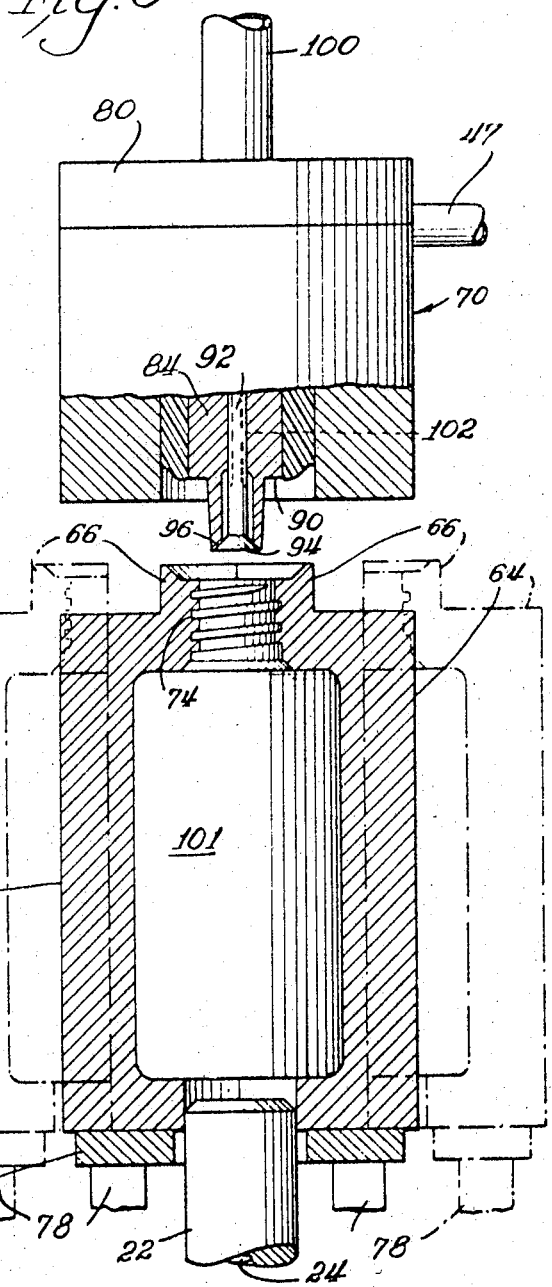
INVENTOR.
Grant W. Cheney

United States Patent Office 3,466,701
Patented Sept. 16, 1969

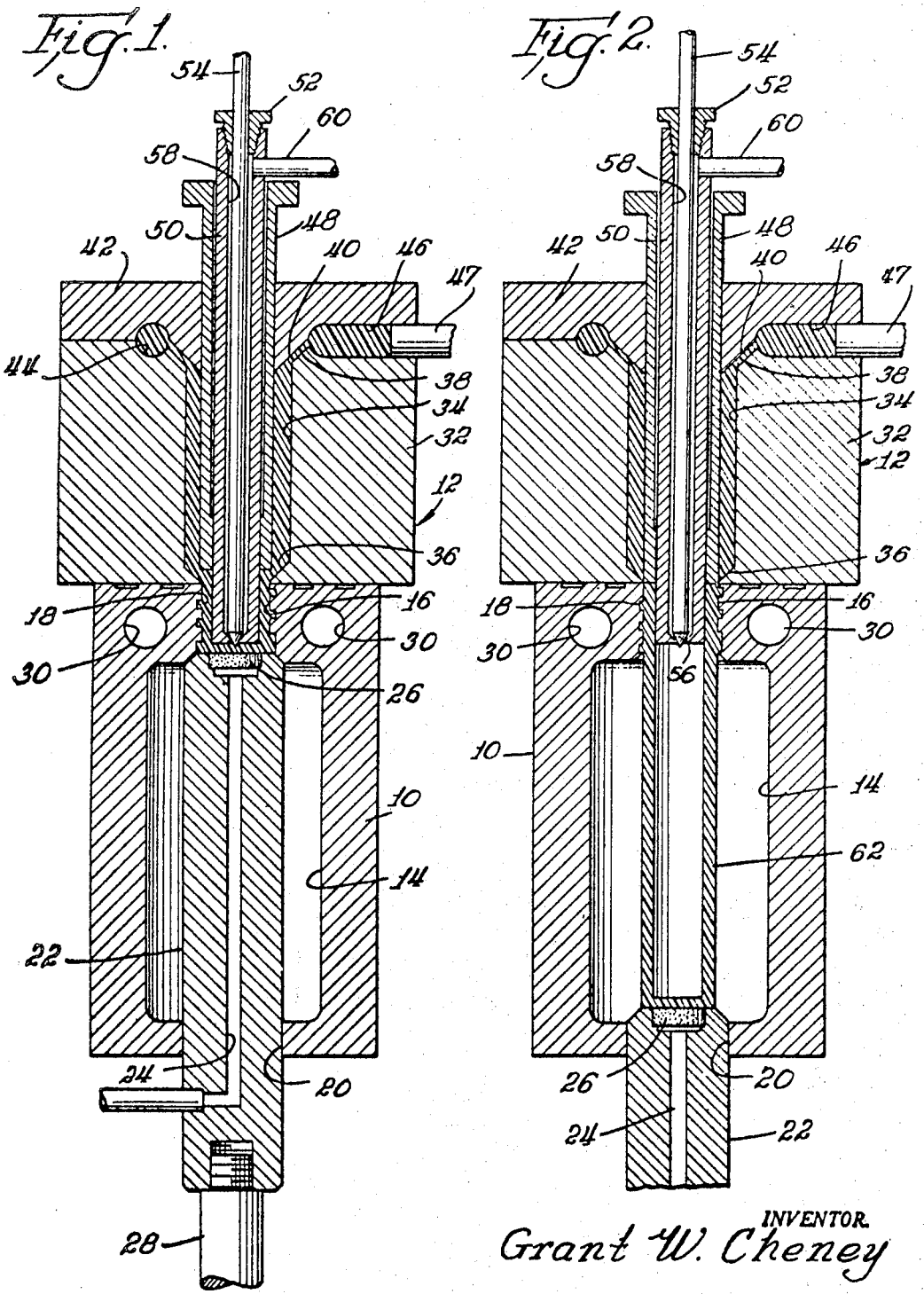

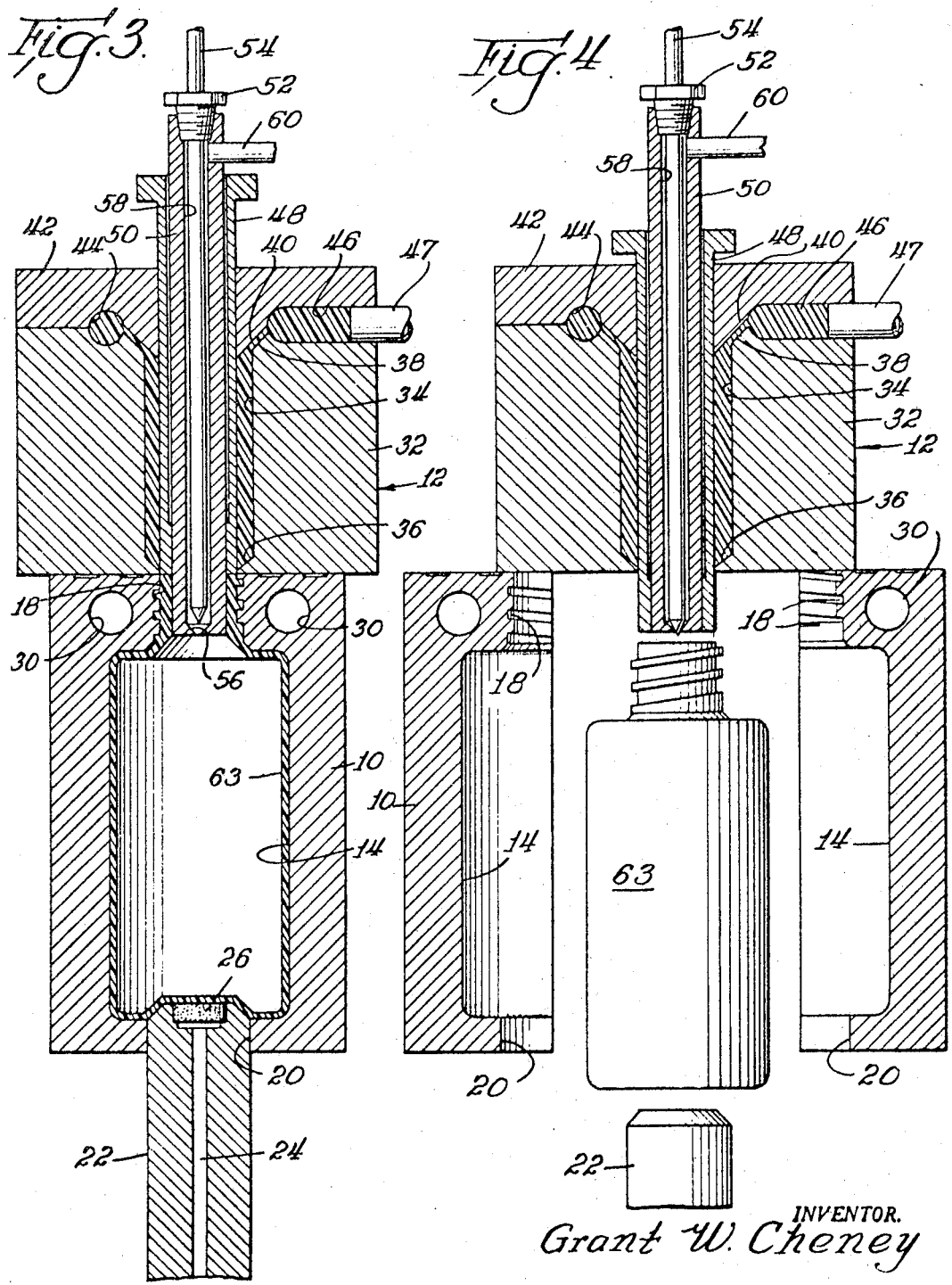

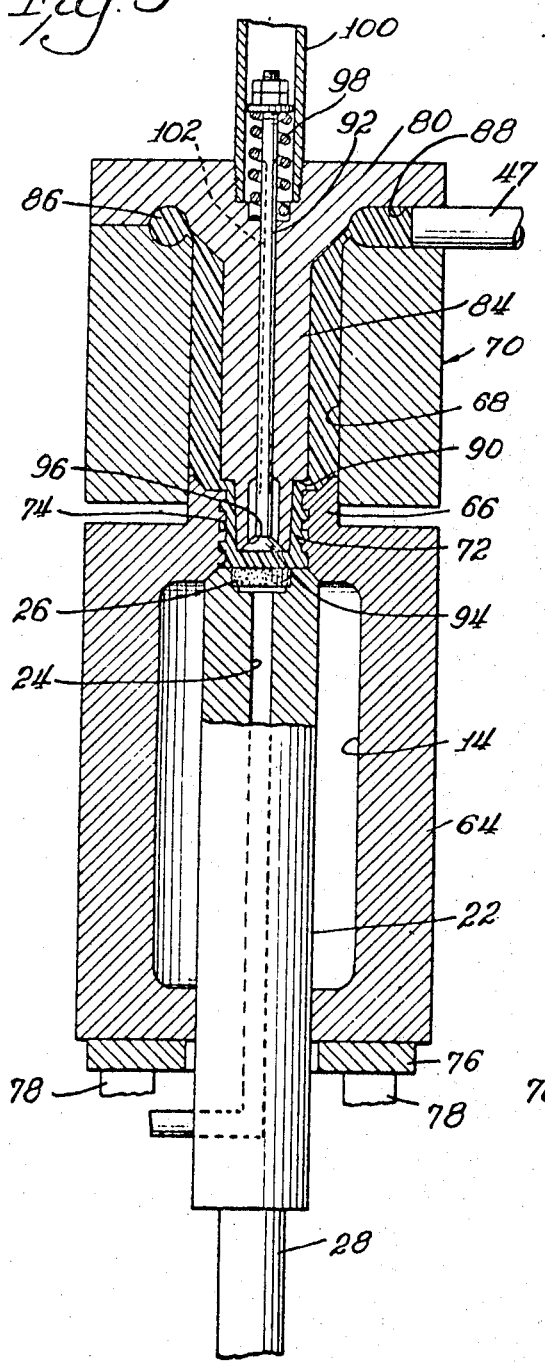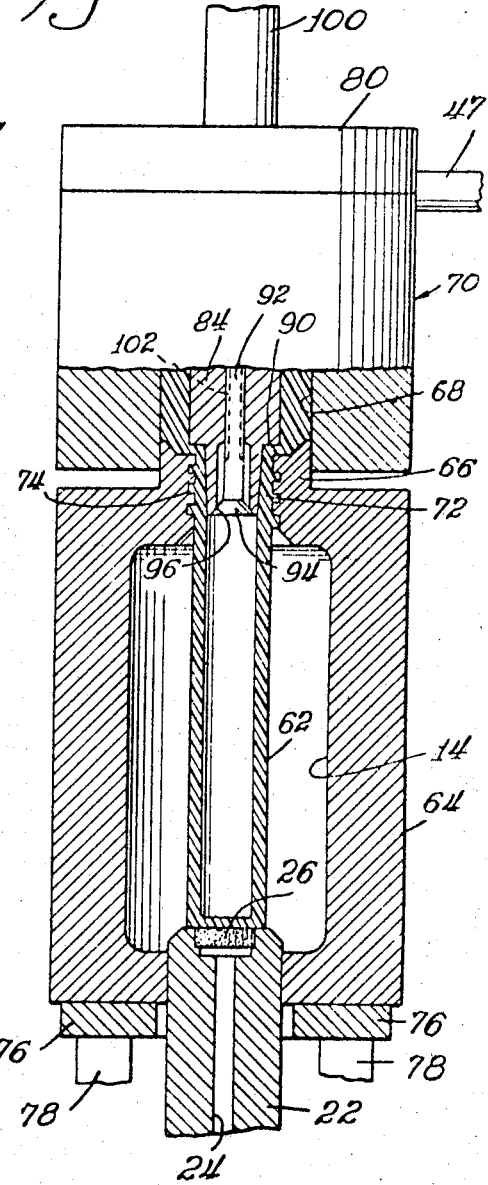

3,466,701
APPARATUS FOR BLOW MOLDING BOTTLES
Grant W. Cheney, Midland, Mich., assignor to The Dow Chemical Company, Midland, Mich., a corporation of Delaware
Continuation of application Ser. No. 502,770, Oct. 19, 1965, which is a continuation-in-part of application Ser. No. 27,775, May 9, 1960. This application Apr. 3, 1968, Ser. No. 718,491
Int. Cl. B29c 17/07
U.S. Cl. 18—5
7 Claims

ABSTRACT OF THE DISCLOSURE

A machine for blow molding plastic bottles comprising: an extruding head for extruding a parison, blow molds parts with neck forming cavities, a plunger arranged for movement between the blow mold parts to engage the extruding head and means to blow mold the parison in the blow mold parts when they are closed.

---

This application is a continuation of application Ser. No. 502,770, filed Oct. 19, 1965 which is a continuation-in-part of U.S. application Ser. No. 27,775, filed May 9, 1960 and now Patent No. 3,394,209.

This invention relates to an improved apparatus for molding hollow items.

In the parent application there is disclosed a multi-cavity bottle forming die having an extruding head associated with it. The head is arranged with its inner recess or cavity opening into a first split type neck die for the bottle. A second split type neck die is loated within the bottle forming die in abutting relation with the first neck die, and is adapted to be reciprocated. Each neck die has a cavity with spiral grooves on its wall, whereby a thread will be formed upon the neck of the bottle formed in the bottle forming die. According to the method of the invention, molten plastic material is ejected under pressure from the cavity in the extruding head into and then through the cavity in the first neck die into the second neck die. Then the latter is drawn away from the former while there is continued ejection of plastic material through the first or stationary neck die, to form an elongated plastic tube, the ends of which are integral with the finished bottle neck portions formed in the two neck dies. Subsequently, the multi-cavity die is closed, and the tube is blown at both ends to form two plastic bottles.

In accordance with the persent invention, the apparatus of said parent application can be modified so as to provide an improved apparatus for molding a single hollow item, such as a finished bottle. The apparatus of the present invention differs from that described above primarily in the manner in which the elongated plastic tube is drawn downwardly. The latter change is necessitated due to the fact that only a single bottle, rather than two bottles as described above, is molded at one time.

With the present invention, a plunger is slidably arranged in the molding die and is adapted to engage the bottom edge of a neck cavity to close it, so that when plastic material is injected into the molding die a neck portion having a closed end (that end which engages the plunger) is formed. The plunger is further adapted to draw the closed end away from the neck cavity, to form an elongated tube which has one end integral with the neck portion formed within the neck cavity. The elongated tube is thereafter blown, to form a bottle.

Accordingly, it is an object of this invention to provide improved apparatus for molding hollow items.

Another object is to provide means for producing high quality thermoplastic blown bottles having good dimensional tolerance.

Still another object of the invention is to provide means for producing high quality thermoplastic blown bottles which may be ejected in finished form from a molding die.

Other objects of the invention will in part be obvious and will in part appear hereinafter.

For a fuller understanding of the nature and objects of the invention, reference should be had to the following detailed description taken in connection with the accompanying drawings, in which:

FIG. 1 is a section view illustrating an arrangement which may be used for practicing the method of the invention and showing the relative position of various parts as a neck portion of a thermoplastic bottle is being molded;

FIG. 2 is the same but showing the position of various parts after full extrusion of a closed end parison;

FIG. 3 is the same but showing the relationship of the various parts at the time the parison is blown into engagement with the die cavity;

FIG. 4 is the same but showing the arrangement of the various parts upon removal of the molded bottle from the die;

FIG. 5 shows a modified arrangement for practicing the method of the invention and showing the position of the relative parts while molding the neck portion of a thermoplastic bottle;

FIG. 6 is the same as FIG. 5 but showing the position of the various parts after a parison has been molded;

FIG. 7 is the same but showing the position of various parts at the time the parison has been blown into engagement with the walls of the die cavity; and FIG. 8 is the same but showing the position of various parts upon removal of the molded bottle from the die.

Similar reference characters refer to similar parts throughout the several views of the drawings.

Referring now to the drawings, and more particularly to FIGS. 1 to 4, the numeral 10 identifies a molding die of the split type, which is arranged for movement into engagement with an extruding die or head 12, so that molten plastic material may be injected into the molding die. A cavity 14 is formed in the die 10, the shape or configuration of said cavity being such as to provide desired bottle shape, which may be circular or irregular. At the upper end of the die 10 is an opening 16 arranged to form the neck portion of the bottle to be molded in the die, which opening may be formed with a spiral groove, or recess 18 to provide a thread means on the neck portion of the bottle. An opening 20 is arranged at the lower end of the die 10 for slidably receiving a plunger 22 movable into the die cavity for seating engagement with the lower edge of the opening 16. A passageway 24 is provided in the plunger, the lower end of which is adapted for receipt of a pipe for connection to a vacuum source, the upper end of said passageway being enlarged to receive a porous disc 26. Affixed to the lower end of the plunger 22 is a rod 28 for connecting the plunger to a motive means (not shown) whereby the plunger may be reciprocated in the die. Passageways 30 may be arranged in the die 10 for cooling purposes if necessary under specific molding conditions.

The extruding head 12 includes a lower section 32 having a cylindrical opening or passageway 34 extending therethrough, which opening has an inwardly tapered portion 36 at the lower end and an outwardly tapered portion 38 at the upper end. The tapered portion 38 is adapted to receive in spaced relation a conical portion 40 formed integral with a cover or cap means 42 which serves as an upper section of the extruding head 12. A toroidal passageway 44, formed between the lower section 32 and upper section 42, is intersected by a passageway 46 arranged for receiving molten plastic material from a source (not shown) via a tube or pipe 47. Slidably supported within the die cap portion 42 is a flow control valve in the form of a sleeve member 48 the external diameter of which is less than that of the passageway 34, but substantially equal to that of the minimum diameter of the tapered portion 36. It will be seen that when the sleeve 48 is in lowermost position it will seal off flow of plastic material from the passageway 34 into the neck portion 16 of the molding die 10. Positioned within the flow control valve 48 is a sleeve or tube 50, the lower end of which projects into the neck portion 16 to form a mandrel which is in spaced relation to the walls thereof, the upper portion of which threadably receives a bushing 52 for slidably supporting a valve means in the form of a rod 54 within the sleeve 50. The lower end of the rod 54 is tapered to seat in air-tight manner upon a tapered opening 56 formed in the lower end of the sleeve 50. A cylindrical space 58 provided between the rod 54 and the inner surface of the sleeve 50, is supplied with compressed air flowing from a pressure source (not shown) through a pipe or tube 60 connected to the upper end of the sleeve 50. Motive means (not shown) are arranged for providing selective reciprocal movement of both the valve 48 and the rod 54.

The above described structure provides a preferred means for practicing the method of the invention, which will now be discussed. FIG. 1 illustrates an initial part of the molding cycle, and shows the valve 48 in retracted position, thus allowing flow of plastic material under pressure from the passageway 34 into the die neck portion 16. As soon as molding of the neck portion 16 occurs, the plunger 22 is moved downwardly to draw a closed end parison 62 having an elongated wall, all as illustrated in FIG. 2. Drawing of the parison is assisted by the vacuum holding engagement of the plunger with the bottom of the parison. One of the chief functions of the plunger is to provide an abutment for forming the closed end of the parison during bottle neck molding operation. Under certain conditions it may be desirable to move the plunger away from engagement with the bottom of the parison while it is being drawn so that parison formation is independent of plunger movement. When the parison is fully drawn, as shown in FIG. 2, the valve 48 is moved downwardly to cut off flow of material into the neck portion 16. Injection of material through the neck portion to form an integral parison represents a significant contribution to the art of blow molding thermoplastic bottles. It is to be noted that flow shut-off movement of the valve 48 provides a finished edge around the neck portion opening, thus eliminating subsequent trimming operations. While the parison molding has been shown as being drawn downwardly, it may be desirable to invert the extruding die and molding die so that molding occurs in an upward directoin, i.e., the parison bottom is drawn upwardly.

When the bottle neck portion and integral parison 62 have been formed, as illustrated in FIG. 2, the rod 54 is drawn upwardly to allow flow of compressed air into the parison from the pressurized air source via tube 60 and the cylindrical space 58 of the sleeve 50. The compressed air will blow, or expand, the parison 62 into engagement with the die cavity 14, thus forming a bottle 63 having the desired shape. While blowing of the parison may be accomplished with the use of compressed air, obviously other methods may be utilized if desired, for example, a vacuum, or subatmospheric pressure may be applied to the parison exterior, while pressure somewhat above the exterior pressure may be applied to the parison interior. In any arrangement the important objective is to apply a pressure differential to the walls of the parison to cause a change in shape thereof, which change of shape may be radially outward or radially inward. Subsequently, the rod 54 is moved downwardly to seat within the lower end of the sleeve 50, to cut off communication between the compressed air source and the interior of the formed bottle.

The foregoing described steps comprise the bottle molding operation; all that remains is to open the die 10 and remove the finished molded bottle 63 therefrom. It may be necessary to allow for cooling of the bottle before opening the molding die so that the bottle will set and retain its molded form. If found necessary and desirable, such cooling period may take place after the unopened die has been moved from the injecting station or position, and for such purpose a die conveyor system may be utilized.

In FIGS. 5 to 8 inclusive is illustrated a modified arrangement for practicing the method of the invention, and which differs from that described above primarily in the manner of cutting off flow of thermoplastic material to the molding die; the same numerals will be used for identification of elements in common with those in the first embodiment.

Referring now to FIG. 5, the numeral 64 identifies a molding die of the split type which includes at the upper end a protrusion 66 arranged for slidable engagement with a cylindrical opening or passageway 68 formed in an extruding head or extruding die section 70. Within the protrusion 66 is formed an opening 72 having a spiral groove 74 arranged to provide a thread means on the neck of a bottle to be formed within the molding die 64. The plunger 22 slidably arranged in the molding die 64, is formed to engage the bottom edge of opening 72 at upward limit of plunger movement. Means to provide vertical movement of the molding die 64 may be provided in the form of a ring 76 arranged at the bottom of the molding die 64 and connected by rod means 78 to a motive means (not shown).

An extruding head or die includes the lower die section 70, and an upper die section 80, having a cylindrical portion 84 forming a mandrel which projects downwardly in spaced relation to the walls of the passageway 68, and extends into the neck portion 72 of die 64 when the latter is positioned in molding position as shown. A toroidal passageway 86, formed in part by the upper surface of the die section 70 and the lower surface of the upper die section 80, is served by a passageway 88 for flow of plastic material through the pipe or tube 47 from a source (not shown), to the passageway 68. The mandrel 84 is formed with a shoulder 90 adapted to seat upon a top surface of the molding die protrusion 66 when the molding die 64 is moved upwardly to cut off flow of plastic material, as will later be described. Valve means to regulate flow of compressed air into the molding die 64 for bottle blowing purposes, includes a rod 92 having a tapered head 94 at the lower end for engagement with a valve seat 96 formed in the mandrel 84, which rod 92 is slidably supported by the mandrel as shown. At the upper end of the rod 92 is a compression spring 98 adapted to urge the rod 92 upwardly so that the valve head 94 normally remains in air-tight engagement with the valve seat 96. Means in the form of a pipe connection 100 surrounds the spring loaded end of the rod 92, which pipe 100 is connected to a source of pressurized medium, such as compressed air (not shown). The rod 92 has a plurality of longitudinal grooves 102 extending a substantial distance upon the surface whereby compressed air can flow from the pipe 100 and past the valve seat 96, when the valve head 94 is unseated therefrom.

The operation of the modified arrangement discussed above is as follows: as shown in FIG. 5 the molding die 64 has been moved so that the end surface of the neck portion opening 72 is a spaced distance from the shoulder 90, thus allowing flow of plastic material under pressure from die passageway 68 into the bottle neck portion 72 to thereby mold the neck portion of a bottle. After the bottle neck portion has been formed, the plunger 22 is drawn or retracted from the molding die 64 and the parison 62 is extruded through the molded neck portion of the bottle. The rate of retracting the plunger 22 determines the wall thickness of the parison under given molding pressure conditions. The parison bottom is maintained in contact with the upper end of the plunger 22 by virtue of the sub-atmospheric, or vacuum pressure conditions existing in the plunger passageway 24 and applied to the parison bottom through the porous disc 26.

When the parison 62 has been fully drawn, as indicated in FIG. 6, the molding die 64 is moved upwardly so that the end surface of the protrusion 66 seats against the shoulder 90 of the mandrel 84, thus discontinuing flow of plastic material into the molding die 64. It is to be noted that such material flow shut-off provides a finished condition to the edge around the opening of the bottle neck portion, thereby eliminating subsequent trimming or finishing operations.

Compressed air is next fed into the pipe 100 causing unseating of the valve head 94, and flow of compressed air into the parison 62 to extend the walls thereof into contact with the walls of the die cavity 14, thereby providing a bottle 101 having the desired shape.

The molding die 64 is next moved downwardly so that the die protrusion 66 is moved clear of the end of the mandrel 84, and the molding die is opened and the molded bottle 101 removed therefrom. During this latter stage of the bottle molding cycle, extruding pressure is removed from the plastic material in the passageway 68, and since the plastic material is somewhat tacky, and of high viscosity, flow of material from the die passageway 68 at the time the molding die 64 has been moved away from engagement with extruding die section 70, will be avoided. Again it is mentioned that the unopened molding die 64 may be moved to a cooling station prior to opening thereof, if such is required for the thermoplastic material of the bottle to set. While the molding die 64 has been described as the movable element for control of plastic flow into the die, obviously, the injecting die assembly 70, 80 may be movable to achieve material flow control. In addition, it is reasonable to assume that the means for providing the required timed sequence of the movable elements in the molding assemblages described, may be easily designed and would pose no serious problem for those skilled in the art of thermoplastic blow molding apparatus.

No specific mention has been made of the type of plastic material usable in the practice of the method of the invention, however, it is to be understood that any organic material having the necessary degree of elasticity, and adapted to be used for blow molding plastic bottles, such as normally solid polyolefins, particularly polyethylene, polypropylene, copolymers of ethylene and propylene and the like, polystyrene and similar alkenyl aromatic resins and rubber modified variations thereof, vinyl chloride polymers, nylon and so forth, may be satisfactory.

It should now be apparent that the method of the invention as disclosed above, will provide fast, economical production of high quality thermoplastic blown bottles, and more particularly, may be used for producing thermoplastic blown bottles having an integrally molded neck portion, with or without threads, and wherein the steps of bottom welding, trimming and/or post finishing operation are not required. While the disclosure has described the method of the invention as applied for producing "bottles," such is by way of example since obviously the method of the invention may be applied for the production of other hollow items, such as bulbs, flasks, vases, etc.

It may happen when blow molding thermoplastic bottles according to the method of the invention, and especially when the wall of the bottle neck portion is relatively thin and/or devoid of threads, that all, or substantially all of the molten plastic material initially injected into the molding die, will move downwardly as the parison is being drawn, so that the initially injected material forms the lower end of the closed end parison. Such a possibility is within the ambit of the invention, even though the foregoing disclosure has stressed formation of the bottle neck portion first, followed by formation of the closed end parison by material flowing through the bottle neck portion, as will happen in the usual case.

It will thus be seen that the objects set forth above, among those made apparent from the preceding description, are efficiently attained, and since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. An assemblage for blow molding a thermoplastic bottle comprising a split type molding die formed to provide an opening at one end, an extruding head including a mandrel arranged for insertion within said molding die opening and in spaced relation to the wall of said opening, a plunger slidably supported by said molding die and arranged for movement into engagement with an inner edge of the molding die opening to form the bottom of a neck cavity, said plunger being formed to provide a passageway for application of a sub-atmospheric pressure to the end surface of the plunger, said extruding head being arranged to inject thermoplastic material into said molding die opening to form a neck portion of a bottle within the neck cavity and to continue such injecting as the plunger is drawn away from engagement with said opening to form a closed end parison, a valve means within said extruding head for shutting off injection of said material into the molding die opening, said valve means being further arranged to provide a smooth end surface on the bottle neck portion formed in said opening, and means to admit pressurized medium into the drawn parison to expand the parison into engagement with an inner wall of the molding die.

2. An assemblage for blow molding thermoplastic bottles according to claim 1, wherein said molding die opening is provided with a spiral groove adapted to form threads on the neck portion of the bottle being molded.

3. An assemblage for blow molding a thermoplastic bottle according to claim 1 comprising, a split type die formed to provide a cavity therein, a protrusion formed on the upper end of said molding die, an opening extending through said protrusion and connecting with said cavity, a plunger slidably arranged in the molding die and adapted to engage an inner edge of said opening to form the bottom of a neck cavity, an extruding head formed to provide a cylindrical opening adapted to slidably receive said protrusion of said molding die, said extruding head including a mandrel arranged for insertion within said molding die opening in spaced relation to the walls thereof, said extruding head being arranged to inject thermoplastic material into said molding die opening to form a neck portion of a bottle within the neck cavity and to continue such injection as the plunger is drawn away from engagement with said opening to form a closed end parison, a valve means within said extruding head for shutting off injection of said material into the molding die opening, said valve means being further arranged to provide a smooth end surface on the bottle neck portion formed in said opening, and means to admit pressurized medium into the drawn parison to expand the parison into engagement with an inner wall of the molding die.

4. An assemblage for blow molding a thermoplastic bottle according to claim 3 comprising a split type molding die formed to provide a cavity therein, a protrusion formed on the upper end of said molding die, an opening extending through said protrusion and connecting with said cavity, said opening being provided with a spiral groove adapted to form threads on the neck portion of the bottle being molded, a plunger slidably arranged in the molding die and adapted to engage an inner edge of said opening to form the bottom of a neck cavity, an extruding head formed to provide a cylindrical opening adapted to slidably receive said protrusion of said molding die, an upper die section affixed to said extruding head and being formed with a projection the lower end of said projection forming a mandrel arranged for insertion within said molding die opening in spaced relation to the walls thereof, said mandrel including a shoulder adapted to seat upon a top surface of said protrusion of said molding die whereby flow of molten plastic from said extruding head to said die can be cut off in even fashion, a valve means including a reciprocal rod one end of which has a valve head adapted for air tight seating upon a valve seat formed on the inner end of said mandrel, the other end of said rod being arranged to receive a compression spring means adapted to urge the rod valve head into engagement with said mandrel valve seat, means to conduct pressurized medium about said valve for flow into said die cavity when the valve is unseated, said extruding head cylindrical opening being arranged for receipt of molten plastic for flow under pressure to said molding die opening, and means to provide relative movement between the plunger and the extruding head whereby molten plastic flow from the extruding head to the molding die may be controlled.

5. An assemblage for blow molding a thermoplastic bottle according to claim 4 wherein said mandrel includes a shoulder arranged for engagement with an end surface of said molding die protrusion whereby molten plastic flow from the extruding die cylindrical opening into the molding die opening may be interrupted.

6. An assemblage for blow molding a thermoplastic bottle according to claim 4 wherein means are provided for moving the molding die toward the extruding head.

7. An assemblage for blow molding a thermoplastic bottle according to claim 1 having means defining cooling passageways within said molding die in operative juxtaposition to said opening.

References Cited

UNITED STATES PATENTS

| | | | |
|---|---|---|---|
| 2,443,053 | 6/1948 | Parmelee | 18—14 X |
| 3,109,198 | 11/1963 | Guignard | 18—14 X |
| 3,196,592 | 7/1965 | Cheney | 18—5 X |
| 3,296,345 | 1/1967 | Dietz | 18—5 X |

WILBUR L. McBAY, Primary Examiner

U.S. Cl. X.R.

53—140